United States Patent [19]

Martin

[11] 4,366,838

[45] Jan. 4, 1983

[54] MOORING ASSEMBLY FOR COUPLING A SUBMARINE CONDUIT TO ANOTHER CONDUIT

[75] Inventor: Jean G. M. Martin, Paris, France

[73] Assignee: Compagnie Generale pour les Developpements Operationnels des Richesses Sous-Marines"C.G. Doris", Paris, Japan

[21] Appl. No.: 177,958

[22] Filed: Aug. 14, 1980

[30] Foreign Application Priority Data

Aug. 23, 1979 [FR] France ................................ 79 21241

[51] Int. Cl.³ .............................................. B63B 21/00
[52] U.S. Cl. .................................... 137/615; 114/230; 441/5
[58] Field of Search ..................... 114/230, 257; 9/8 P; 141/279, 387, 388; 137/615; 285/24

[56] References Cited

U.S. PATENT DOCUMENTS

| | | | | |
|---|---|---|---|---|
| 3,835,655 | 9/1974 | Oliver | ............................. | 285/24 X |
| 3,910,609 | 10/1975 | Van Der Gaay | ..................... | 285/24 |
| 3,921,684 | 11/1975 | Allen | .................................... | 141/279 |
| 4,231,398 | 11/1980 | Gibbons | ............................. | 137/615 |
| 4,254,728 | 3/1981 | Patinet | ................................ | 114/230 |
| 4,262,380 | 4/1981 | Foolen | .................................. | 9/8 P |
| 4,262,620 | 4/1981 | Nooteboom | ....................... | 114/230 |
| 4,262,696 | 4/1981 | Oury | .................................... | 137/615 |

*Primary Examiner*—A. Michael Chambers
*Attorney, Agent, or Firm*—Neil F. Markva

[57] ABSTRACT

A mooring assembly connects a submarine conduit to another conduit of a pipe-line or fixed installation. The mooring assembly comprises a mooring frame, a movable mooring arm and a mooring head. The conduit is to be connected to the mooring head having a lateral passage through which the end of the conduit may extend. The movable mooring arm is pivotally mounted on the mooring frame. One end of said other conduit is fixed on the pivot axis of the mooring arm. A connecting pipe connects the end of the submarine conduit to the end of the other conduit. A coupling assembly at the outwardly extending end of the mooring head pivotally connects an axial extension of the end of the conduit to be connected to the mooring head.

8 Claims, 3 Drawing Figures

FIG.:2

MOORING ASSEMBLY FOR COUPLING A SUBMARINE CONDUIT TO ANOTHER CONDUIT

BACKGROUND OF THE INVENTION

This invention relates to a device for coupling a submarine conduit to another conduit of a pipe-line or fixed installation, the submarine conduit being at least temporarily maintained in hydrostatic equilibrium by a lightening system such as floats, etc.

In theory, the connection of a submarine conduit to another conduit, of a pipe-line or storage tank for example, does not present any problems. However, in practice, certain problems do arise. In fact, despite all the precautions taken, it frequently happens that variations occur with regard to the planned direction and distance. Variations regarding direction only present slight disadvantages, but the variations in distance are more serious. If, for example, the conduit is intended to connect a well to a storage tank, then the tank, which is a large volume construction sometimes having to be submerged at considerable depth, cannot be positioned with any great precision from the surface. To overcome these disadvantages, U.S. Pat. application Ser. No. 886,061, now U.S. Pat. No. 4,254,728, proposes a coupling device which makes it possible to moor the end of a submarine conduit at an exactly defined distance in relation to the end of another fixed conduit and to connect the ends of the two conduits by a standard connecting pipe.

The known device comprises a mooring frame resting on the sea-bed on which a mooring arm is arranged which can be rotated in a horizontal plane. The end of the fixed conduit is secured on the axis of rotation of the arm. The arm, at its movable end, comprises a hollow cylindrical portion leading to a conical portion which cooperates with a mooring head fixed to the end of the conduit which is to be connected.

The mooring head comprises a partly cylindrical body fixed to the end of the conduit on its axis, and having a lateral passage through which the end of the conduit may extend, releasable means for attaching the mooring head to a towing cable, means for securing the mooring head to the rotatable mooring arm, and positioning means fixed on to the cylindrical body in such a way as to predetermine the angular position of the end of the conduit to be connected in relation to the perpendicular.

SUMMARY OF THE INVENTION

The present invention consists of a coupling device and, in particular, a mooring head making it possible to obtain a better facility for rotation and adjustment of the conduit to be moored.

These advantages are obtained by fitting the mooring head with coupling means enabling its relative rotation around the axis of the end of the conduit to be connected.

According to the invention, a mooring assembly connects a submarine conduit to another conduit of a pipeline or fixed installation. The mooring assembly comprises a mooring head having a partly cylindrical body for connection to the end of the submarine conduit on the axis thereof. The cylindrical body has a lateral passage through which the end of the conduit may extend. The assembly includes a mooring frame with a pivoted mooring arm rotatably disposed about a pivot axis. One end of the other conduit is fixed on the pivot axis of the mooring arm. A connecting pipe is used to connect the end of the submarine conduit to the end of said other conduit. The mooring head includes coupling means allowing rotation about the axis of the connecting end of the submarine conduit with respect to the mooring head.

BRIEF DESCRIPTION OF THE DRAWINGS

The following is a description of an embodiment of the invention, by way of example, reference being made to the accompanying drawings in which:

FIGS. 1 and 2 represent an embodiment of the assembly according to the invention, the conduit being moored but not yet connected.

DETAILED DESCRIPTION

Figure 1:
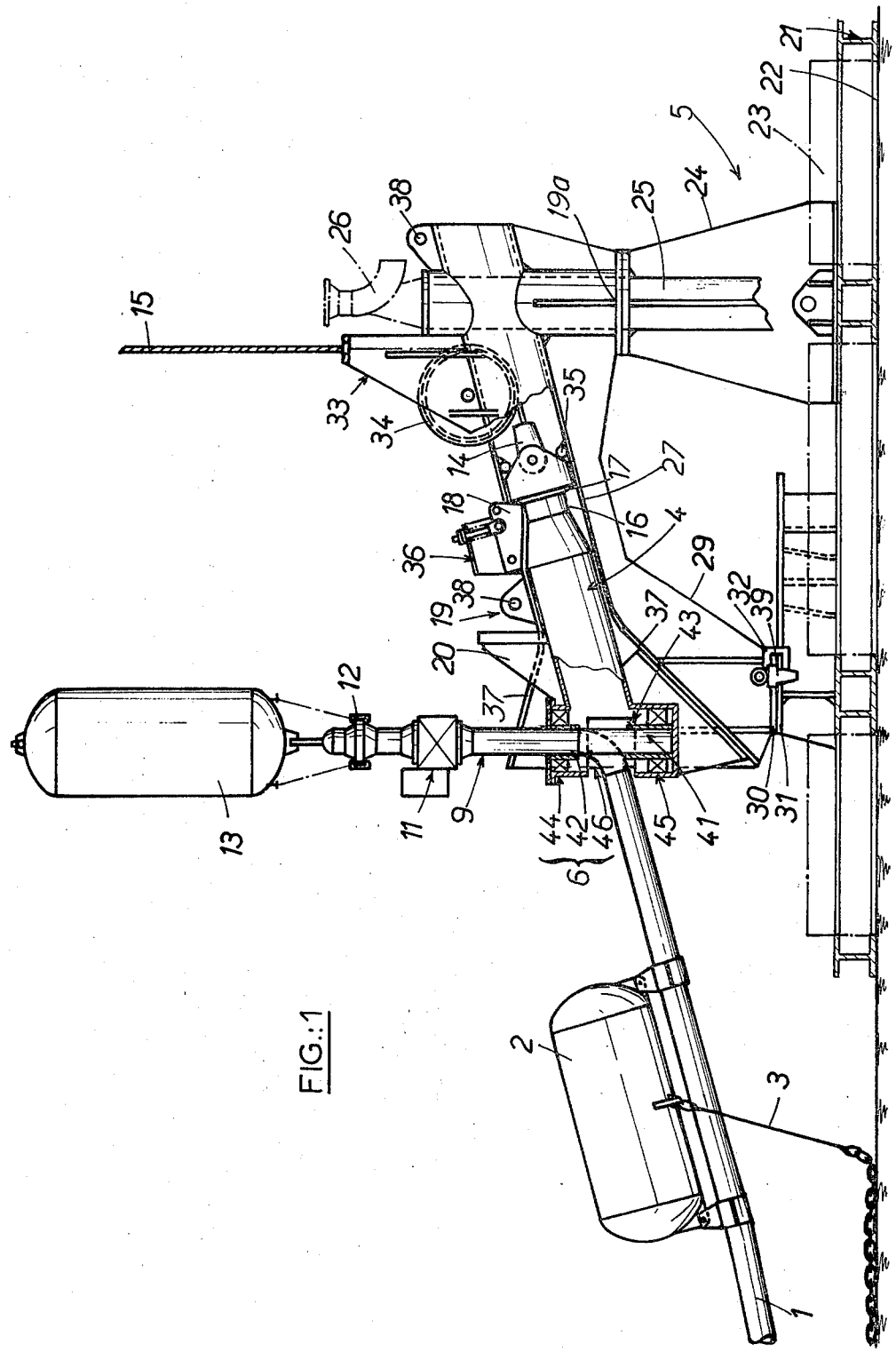
FIG. 1 is a side elevation, partly in section, of an assembly according to the invention while connection is being made.

A submarine conduit 1, which is kept in hydrostatic equilibrium by a system comprising a float 2 and a trail-rope 3, has a mooring head 4 at its end to which it is to be connected. Mooring head 4 is coaxially fixed to the conduit 1. According to the embodiment shown, there is provided a lateral outlet from the connecting end 9 of the conduit. The angle which the outlet makes in relation to the axis of the mooring head 4 will depend on the final slope of the mooring head and will preferably be such that the axis of the end 9 of the conduit 1 is vertical.

Coupling 6 located between the end of conduit 1 and to mooring head 4 to enable relative rotation of mooring head 4 about the substantially vertical axis of connecting end 9 of conduit 1. Thus, the angular position of conduit 1 is unimportant, while coupling means 6 ensures the desired distance between the axes of connecting end 9 and the fixed conduit 26.

Coupling means 6 comprise a shaft 41 and rings 42 and 43 co-axially disposed with respect to connecting end 9 and permitting the rotation of connecting end 9 of conduit in bearings 44 and 45 integral with the mooring head 4. Mooring head 4 includes a notch 46 which allows connecting the end 9 of conduit 1 to pass through it and rotate freely.

Connecting end 9 of conduit 1 is fitted with a valve 11 the outlet of which is closed by a clamp 12. The clamp 12 is fitted with a device providing for closure of the outlet of the valve and the temporary fixing of a lightening float 13.

The part of the body of mooring head 4 remote from conduit 1 has, at its end, attachment means 14 for releasably attaching a cable 15. Finally, the body of mooring head 4 has locating means 16 which, in this embodiment, are in the form of a groove. One side of groove 16 forms an abutment surface cooperating with a locking means 18 fixed on a movable arm 19 described below.

The mooring head 4, and more particularly its body, has a positioning projection 20 fixed so as to ensure an exact angular positioning of connecting end 9 of conduit 1.

A mooring frame assembly, generally designated 5, secures the end of conduit 1 and enables it to be connected to a pipe-line or fixed installation assembly 5 comprises a frame 21 formed of an assembly of metal or concrete beams which, according to the embodiment, define a rectangular base. At least one section of frame 21 has in its lower part a floor 22 formed, for example, from welded sheet-metal, thus forming containers which will be ballasted by ballasting blocks 23 after positioning assembly 5. Assembly 5 has a plinth 24, at the center of which is fixed a column 25. The end of a fixed conduit 26 is attached to the end of column 25, on the axis thereof.

The arm 19 has a cylindrical bearing 19a which is fitted on to the column 25. Bearing 19a together with mooring head 4 is movable in a horizontal plane through an angle of up to 360°. If desired, this angle can be limited to a greater or smaller sector. According to the embodiment described, the angle of rotation is about 90°.

The arm 19 consists of a cylindrical portion 27 extending from a conical portion 28. A stiffening web 29 extends from one end of arm 19 to the other, on its lower part and along the axis thereof. The end of the web 29 situated on the side of the conical portion 28 bears a skid 30 cooperating with a part-annular track 31 fixed to the frame 21 (see FIG. 2). The web 29 also serves for the fixing of a stirrup device 32 enabling the skid 30 to slide around the track 31 while preventing the surfaces of the skid 30 and track 31 from separating vertically. The purpose of the web 29 and the stirrup 32 is to prevent the upward forces from causing arm 19 to become distorted, thus rendering useless the mooring device provided in the cylindrical part 27 of arm 19.

The arm 19 has on its upper part, along a generator thereof and near its axis of rotation, a cable guiding device 33 having a freely rotating pulley 34. The cylindrical portion 27 of arm 19 is fitted internally with a stop 35 against which the end of mooring head 4 abuts. Thus, an exact position for the clamp 12 carried by mooring head 4 is defined in relation to the end of the fixed conduit 26.

The locking means 18 is mounted in a manner to project into the path of mooring head 4. A spring-loaded pivot device 36 enables locking means 18 to rise up during movement of the end of mooring head 4 until the moment when the groove 16 comes opposite locking means 18 which then pivots and engages in groove 16. The part connecting the conical portion 28 to the cylindrical portion 27 has a slot 37, the sides of which are substantially parallel to the generatrix. Slot 37 cooperates with the positioning projection 20 fixed on mooring head 4. When projection 20 is in position in slot 37, the angular position of the end of conduit 1 is accurately determined.

Figure 2:
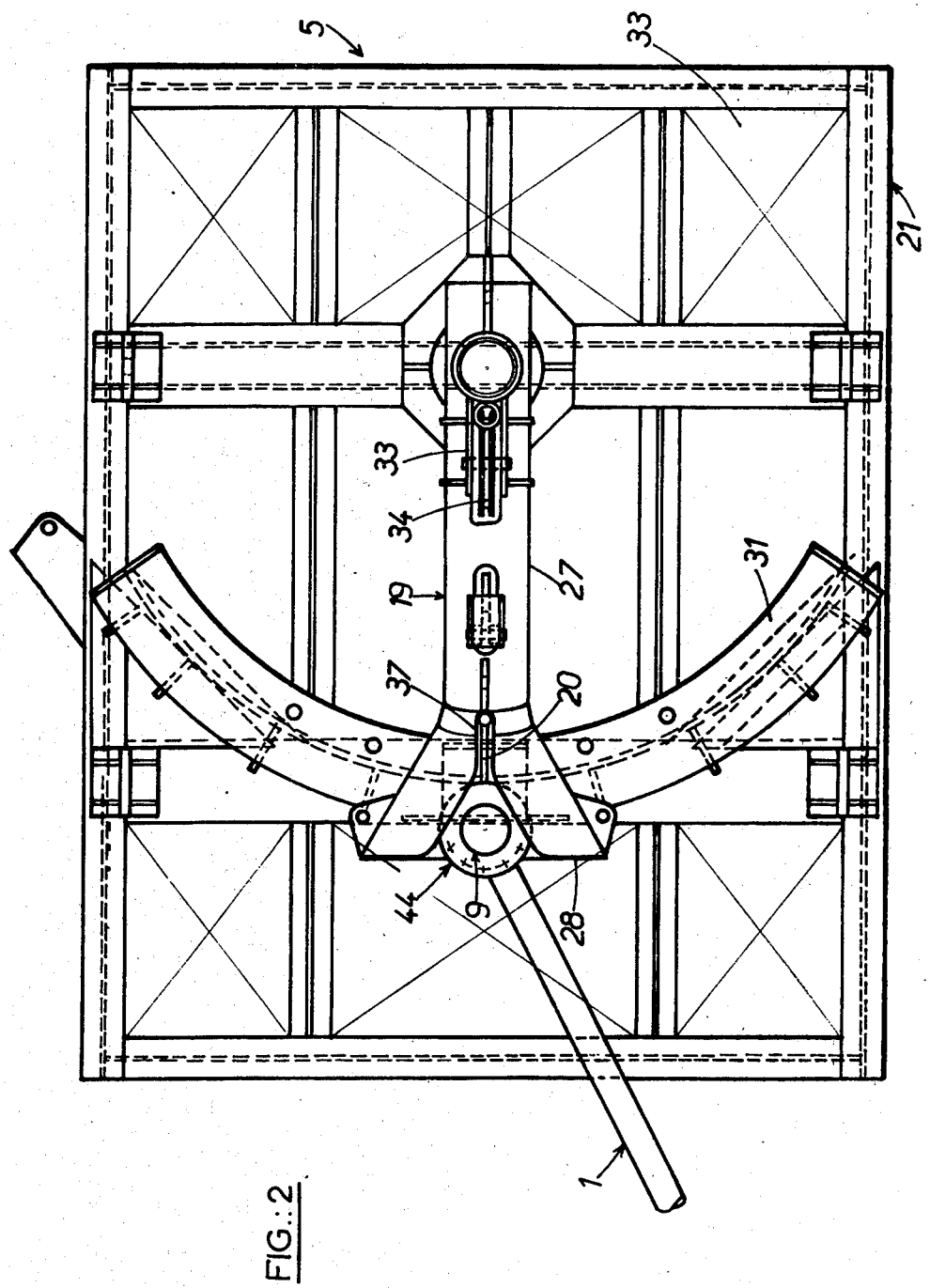
FIG. 2 is a plan view of the assembly of FIG. 1.
Figure 3:
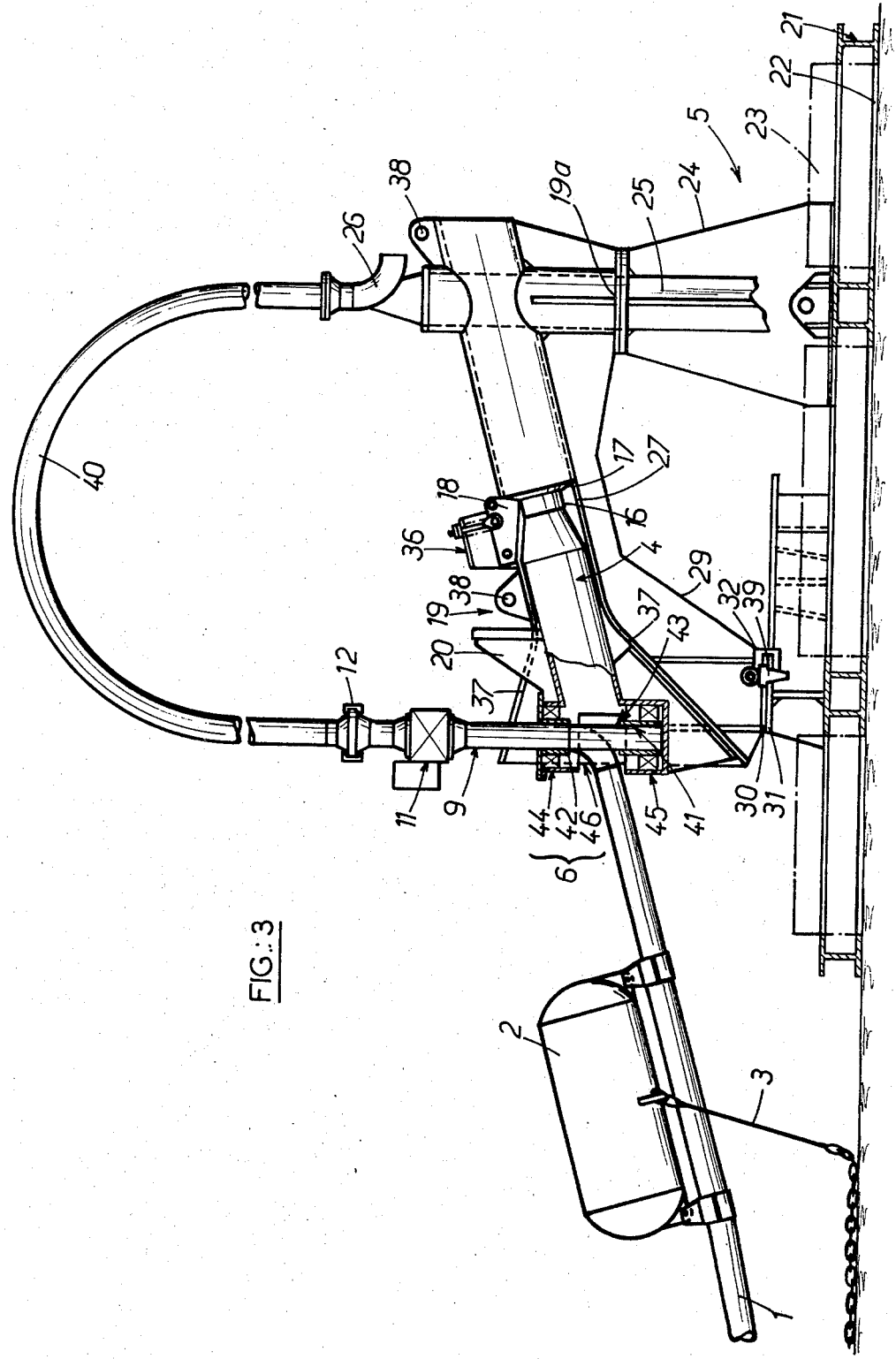
FIG. 3 is a side elevation of the assembly, the conduits being connected.

The slot 37 extends toward the opening of the conical portion 28 with its parallel sides diverging with respect to each other (see FIG. 2). The sides diverge at such an angle that, when mooring head 4 is in place, the outer surface of connecting 28 end 9 of conduit 1 is close to the sides of cone 28 but not in contact with them, so as to avoid damaging the protective sheathing of the conduit (see FIG. 2). The purpose of the conical portion 28 is to assist in the introduction of mooring head 4 into arm 19 and to permit its exact positioning.

A handling lug 38 permitting the positioning of arm 19 on the column 25 and the track 31 is provided on the upper part of the cylindrical portion 27. This operation of mounting arm 19 is carried out before submersion of assembly 5 and obviously before fixing the conduit 26 on to the end of the column 25.

Fixing means 39 keeps arm 19 in its final position when conduit 1 is moored, so as to avoid any movement which may be caused by the action of underwater currents.

When the conduit 1 has been moored and the float 13 has been cast off, a connecting pipe 40 (FIG. 5) is fixed on to the end flange of conduit 1 to connect it to the submarine installation, for example, a submerged storage tank having conduit 26 fixed to the mooring frame assembly 5. According to a preferred embodiment, connecting pipe 40 is U-shaped to provide a certain amount of flexibility to compensate for variation due to constructional tolerances which may exist in the distance between the axes of the flanges of the connecting pipe 40 and in the distance between the axes of the conduit end connecting 9 and the conduit 26.

While the mooring assembly for coupling a submarine conduit to another conduit has been shown and described in detail, it is obvious that this invention is not to be considered as being limited to the exact form disclosed, and that changes in detail and construction may be made therein within the scope of the invention, without departing from the spirit thereof.

I claim:

1. In an assembly for mooring and coupling the end of a submarine conduit to a fixed pipeline or fixed installation, and having a mooring frame including means for attaching the fixed pipeline, a movable mooring arm displaceable in a horizontal plane on the mooring frame, and a mooring head having at one end thereof a structural configuration effective to be detachably connected to the movable mooring arm to provide an outwardly extending end of the mooring head, the combination comprising:

(a) coupling means located at the outwardly extending end of the mooring head to pivotally connect the end of the submarine conduit to allow rotation of the end of the submarine conduit with respect to the mooring head,
    (b) said coupling means includes a body portion having two ends,
    (c) a shaft portion and bearing means,
    (d) said body portion being rigidly connected to the outwardly extending end of the mooring head to receive the end of said submarine conduit,
    (e) said shaft portion being disposed in the body portion for locating the end of the submarine conduit,
    (f) said bearing means includes at least one bearing element disposed at either end of the shaft portion and is coaxially disposed therewith,
    (g) said outwardly extending end of the mooring head including a lateral passage for the end of said submarine conduit to pass through.

2. The combination as defined in claim 1, wherein said coupling means permits said submarine conduit to rotate in either direction about a vertical axis.

3. The combination as defined in claim 1, wherein said bearing means includes a pair of vertically spaced elements located at each end of the shaft portion adjacent the ends of the body portion.

4. The combination as defined in claim 3, wherein said coupling means include a pair of ring elements coaxially disposed along the shaft portion for permitting rotation of the end of the submarine conduit when it is connected thereto.

5. The combination as defined in claim 3, wherein the coupling means is effective to maintain the end of said submarine conduit in a substantially upright position when it is connected thereto.

6. The combination as defined in either one of claims 4 or 5, wherein
   the lateral passage includes a notch at the outwardly extending end of the mooring head for receiving the end of the submarine conduit.

7. The combination as defined in claim 1, wherein
   a connecting pipe connects the end of the submarine conduit to the end of the fixed pipeline or fixed installation.

8. In an assembly for mooring and coupling the end of a submarine conduit to a fixed pipeline or fixed installation, and having a mooring frame including means for attaching the fixed pipeline, a movable mooring arm displaceable in a horizontal plane on the mooring frame, and a mooring head having at one end thereof a structural configuration effective to be detachably connected to the movable mooring arm to provide an outwardly extending end of the mooring head, the combination comprising:

(a) coupling means located at the outwardly extending end of the mooring head to pivotally connect the end of the submarine conduit to allow rotation of the end of the submarine conduit with respect to the mooring head, (b) the outwardly extending end of the mooring head includes a lateral passage for the submarine conduit, (c) said coupling means being disposed at the lateral passage for pivotally connecting the end of said submarine conduit to the outwardly extending end of mooring head, (d) said coupling means being effective to maintain a substantially fixed distance between said submarine conduit and the fixed pipeline or fixed installation, (e) the lateral passage includes a notch at the outwardly extending end of the mooring head for receiving the end of the submarine conduit.

* * * * *

UNITED STATES PATENT AND TRADEMARK OFFICE
CERTIFICATE OF CORRECTION

PATENT NO. : 4,366,838
DATED : January 4, 1983
INVENTOR(S) : Jean G.M. Martin

It is certified that error appears in the above-identified patent and that said Letters Patent is hereby corrected as shown below:

On the title page, in the assignee information, change the assignee's country from "Japan" to --France--.

Signed and Sealed this

Eleventh Day of October 1983

[SEAL]

Attest:

GERALD J. MOSSINGHOFF

Attesting Officer

Commissioner of Patents and Trademarks